United States Patent [19]

Vadasdi et al.

[11] Patent Number: 4,975,167
[45] Date of Patent: Dec. 4, 1990

[54] PROCESS FOR PRODUCTION OF PURE TUNGSTIC ACID OR MOLYBDIC ACID FROM IMPURE ALKALI METAL TUNGSTATE OR MOLYBDATE SOLUTIONS

[75] Inventors: Karoly Vadasdi, Budapest; Ruben Olah, Érd; Laszlo Bartha, Budapest, all of Hungary

[73] Assignee: MTA Kozponti Fizikai Kutato Intezete, Budapest, Hungary

[21] Appl. No.: 407,686

[22] Filed: Sep. 14, 1989

Related U.S. Application Data

[63] Continuation of Ser. No. 181,634, Apr. 14, 1988, abandoned.

[30] Foreign Application Priority Data

Oct. 15, 1985 [HU] Hungary ................................ 3982

[51] Int. Cl.$^5$ .............................................. B01D 57/02
[52] U.S. Cl. .................................. 204/182.4; 204/301
[58] Field of Search .............................. 204/182.4, 301

[56] References Cited

U.S. PATENT DOCUMENTS 4,234,333 11/1980 Ghandehari .................... 75/0.5 BA
4,279,869 7/1981 Coulson ................................. 423/54
4,439,293 3/1984 Vaughan .......................... 204/182.4

Primary Examiner—John F. Niebling
Assistant Examiner—Isabelle R. McAndrews
Attorney, Agent, or Firm—Michael N. Meller

[57] ABSTRACT

Acidification of impure alkali or ammonium tungstate or molybdate solutions prior to electrodialysis to produce tungstic acid or molybdic acid is carried out by the addition of pure tungstic acid or molybdic acid as the salts of tungsten isopolyacids or molybdenum isopolyacids, respectively. This is less expensive than using pure HCl or $H_2SO_4$ and prevents contamination with chloride or sulfate ions. The pure tungstic acid or molybdic acid is isolated from the product.

2 Claims, No Drawings

PROCESS FOR PRODUCTION OF PURE TUNGSTIC ACID OR MOLYBDIC ACID FROM IMPURE ALKALI METAL TUNGSTATE OR MOLYBDATE SOLUTIONS

This application is a continuation, of application Ser. No. 181634, filed Apr. 14, 1988, now abandoned.

BACKGROUND OF THE INVENTION

The invention relates to a process for the purification of alkali metal or ammonium tungstate or molybdate solutions, which are contaminated with hydrolyzed ions. (particularly of silicon, phosphorus, arsenic, tin, antimony, vanadium, tantalum etc.) formed during alkaline treatment of tungsten- or molybdenum-containing materials for the production of tungstic acid or molybdic acid and for recovery of the alkali content by electrodialysis, wherein the tungstic acid or molybdic acid formed by the dialysis (as the salts of tungsten isopolyacids or molybdenum isopolyacids) is used for acidification of the starting solution.

It is known that alkali (especially sodium) or ammonium tungstate or molybdate solutions formed during alkalinization of tungsten- or molybdenum-containing materials (such as ores) are contaminated with different hydrolyzed ions (silicon, phosphorus, arsenic, etc.). The solutions must be purified before further processing. According to known purification processes, the alkaline solution such as a $Na_2WO_4$ solution at a pH of 13 is acidified to a pH of about 9 with an acid such as $H_2SO_4$ or HCl and then aluminum ions are added. The resulting $Al(OH)_3$ precipitate, having a large surface area, binds the impurities present in the solution. The precipitate is removed by filtration and tungstic acid is isolated from the filtrate by conventional methods One such method is by cationic exchange-electrodialysis from the purified alkali or ammonium tungstate solution, whereby the decomposition liquor can also be recovered.

This known process has several disadvantages. On the one hand, there is an economic disadvantage in that a pure acid is necessary for acidification, thus increasing the cost of the process. On the other hand, there are more sources for contamination since sulfate or chloride ions get into the solution.

SUMMARY OF THE INVENTION

The object of the invention consists in the development of a cost-favorable process which does not introduce additional impurities and thus is free from the above-mentioned disadvantages. This is accomplished by using the pure tungstic or molybdic acid produced by the process as the acid employed for acidification of an alkali or ammonium tungstate or molybdate solution prior to the electro-dialysis.

DETAILED DESCRIPTION

A tungsten-containing material, such as an ore, was decomposed with a solution of caustic soda to obtain an impure sodium tungstate solution ($Na_2WO_4$) The pH of the solution was 13—14. The impurities were silicon, arsenic and phosphorus ions. As the first step in the purification this $Na_2WO_4$ solution was acidified to a pH of 9 with a previously prepared sodium metatungstate. The amount of sodium metatungstate to be added depends on the amount of impurities present and is selected so that the pH value of the resulting solution produces the maximum precipitation (hydrolysis) of the ions to be removed.

Among the unobvious features of this invention is the use of the isopolyacid salts for purification purposes, since it was not expected that these materials would be efficient for pH adjustment and for the removal of contaminating ions, e,g., silicon, phosphorus, arsenic etc. This is so since these isopolyacid salts do not react with alkali, i.e., caustic solutions, with the velocity of ionic reactions, that is, instantaneously, as do the common mineral acids. Thus, is would appear that a typical acid-base reaction, i.e.,

is not involved. The reaction of the present invention appears to be that of a degradation of polymers which may involve a lesser proportion of ionization than the simple ionic reaction noted above; for example there is a reaction between pure paratungstate salt and sodium hydroxide, to wit

The compound $Na_5HW_6O_{21}$, appears to exist as $(Na)_{+5}(HW_6O_{21}^{-5})$. In other words, the hydrogen in the salt is not ionizable. Accordingly, in the course of the reaction of pH adjustment this salt is able to bind 7 sodium ions, while according to the formula, if the hydrogen were dissolvable at all, only 1 sodium would bind.

For the molybdenum salt, $Na_6Mo_7O_{14}$, it is not apparent that it can react as an acid with NaOH, as it does not contain any hydrogen. Here again, there is no usual instantaneous reaction between an acid and base. It is not clear whether the polymers degrade in the caustic medium or not, and, if so, with what velocity under the given conditions. It depends, in addition, on the circumstances of reaction on the individual properties of the polymer.

An unobvious aspect of this invention is our recognition that it is the salts of isopolyacids and their mixtures, produced by electrodialysis such as the sodium salts of the isopolyacids, which can be used in the removal of contaminating ions, e.g., arsenic, phosphorus, tin, antimony, vanadium, tantalum, etc., in a rather simple procedure.

It is even more surprising and not at all obvious to those of ordinary skill in the art that polymers of this type also react with the monomer salt, e.g., sodium tungstate, in the course of this purifying process, that is, it appears to be a reaction between a monomer, $(X)Na_2WO_4$ and a polymer $(Y)Na_5HW_6O_2$ which could scarcely be called a reaction which is known to those of ordinary skill in the art. Example To a liter of starting solution containing 104 g/l tungsten (as $WO_4^{-2}$), 43g/l sodium, 1.8 g/l silica ($SiO_2$), 0.3 g/l arsenic (as $ASO_4^{-3}$) and 0.5 g/l phosphorus (as $PO_4^{-3}$), was added one liter of aluminum sulfate ($Al_2(SO_4)_3$ solution in a concentration of 80 g/l as well as 30 ml of a $MgSO_4$ solution in a concentration of 300 g/l Thereafter, 2 liters of sodium isopolytungstate solution having a pH of about 7 containing 16 g/l Na and 103 g/l W, (produced by electrodialysis from which contaminating ions, e.g., silicon, arsenic, phosphorus, etc. were removed) were added. Preparation of this type of solution is described in Hungarian Patent Specification 191827 (1983).

The solution thus obtained had a volume of about 3 liters and a pH of about 9, which, according to the technical literature, represents the optimal pH value of the purification using aluminum and magnesium salts. The combined solutions may optionally be boiled. The resulting precipitate was filtered off and the filtrate containing only a fraction of the contaminents e.g., silicon, phosphorus, arsenic, etc., of the original solution. The filtrate was made alkaline in order to produce the end product, i.e., sodium isopolytungstate. A portion of this end product can be repeatedly used in the purification described above upon adjustment of the pH.

If necessary, $Al^{+3}$ or $Mg^{+2}$ ions are added to the solution so that the resulting aluminum hydroxide or magnesium hydroxide binds the impurities due to its large surface area. The resulting precipitate is removed by filtration leaving a pure sodium tungstate solution as the filtrate.

Pure tungstic acid (in the form of sodium salts of isopolyacids) is prepared from the sodium tungstate solution by means of cation exchange-electrodialysis. The sodium hydroxide solution can be recovered from this step and reused in the decomposition step. Part of the pure tungstic acid as the isopolyacid salt is put back into the process in the acidification of the impure sodium tungstate solution. The rest, the largest part of the pure tungstic acid as the isopolyacid salt, constitutes the end product of the process according to the invention.

From the above description it is clear that the process has achieved the object of the invention since no foreign substances are added during the acidification and the original contaminants, noted above, are removed.

What is claimed is:

1. A process for preparing a pure acid in salt form selected from the group consisting of isopolytungstic acid and isopolymolybdic acid,
    which comprises the steps of acidifying an impure alkaline solution selected from the group consisting of alkaline tungstate solution and alkaline molybdate solution, said solution containing impurities of one or more hydrolyzed ions of elements selected from the group consisting of silicon, phosphorus, arsenic, tin, antimony, vanadium, and tantalum, with an amount of recycled pure isopolyacid formed by electrodialysis such that the pH obtained produces maximum precipitation of the impurities, filtering the solution to remove the precipitate, and subjecting the filtrate to cation exchange-electrodialysis to obtain the pure isopolyacid in salt form.

2. The process according to claim 1, further comprising the step of adding a solution containing aluminum or magnesium ions after acidification in order to hasten the precipitation.

* * * * *

UNITED STATES PATENT AND TRADEMARK OFFICE
CERTIFICATE OF CORRECTION

PATENT NO. : 4,975,167
DATED : December 4, 1990
INVENTOR(S) : Karoly Vadasdi, et al.

It is certified that error appears in the above-indentified patent and that said Letters Patent is hereby corrected as shown below:

On the title page, item (63) and column 1, line 8, after "abandoned" insert --, which is a continuation in part of ser no. 919,133, filed Oct. 15, 1986 abandoned--.

Signed and Sealed this

Seventh Day of September, 1993

*Attest:*

BRUCE LEHMAN

*Attesting Officer*  *Commissioner of Patents and Trademarks*